United States Patent [19]
Jouppi

[11] Patent Number: 6,065,033
[45] Date of Patent: *May 16, 2000

[54] WALLACE-TREE MULTIPLIERS USING HALF AND FULL ADDERS

[75] Inventor: Norman P. Jouppi, Palo Alto, Calif.

[73] Assignee: Digital Equipment Corporation, Maynard, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/808,070

[22] Filed: Feb. 28, 1997

[51] Int. Cl.$^7$ .................................................... G06F 7/50
[52] U.S. Cl. .......................... 708/670; 708/625; 708/708
[58] Field of Search ............................ 364/768, 787.01, 364/786.03, 754.01, 760.02, 757; 395/800; 235/175; 708/670, 626, 625, 708

[56] References Cited

U.S. PATENT DOCUMENTS

| | | | |
|---|---|---|---|
| 3,723,715 | 3/1973 | Chen et al. | 235/175 |
| 4,999,804 | 3/1991 | Nukiyama | 364/784 |
| 5,146,421 | 9/1992 | Adiletta et al. | 364/758 |
| 5,159,568 | 10/1992 | Adiletta et al. | 708/626 |
| 5,161,119 | 11/1992 | Chang et al. | 364/786 |
| 5,265,043 | 11/1993 | Naini et al. | 364/757 |
| 5,303,176 | 4/1994 | Hrusecky et al. | 708/627 |
| 5,327,368 | 7/1994 | Eustace et al. | 364/786 |
| 5,412,591 | 5/1995 | Bapst | 708/625 |
| 5,504,915 | 4/1996 | Rarick | 395/800 |

FOREIGN PATENT DOCUMENTS

| | | |
|---|---|---|
| 0405723A2 | 1/1991 | European Pat. Off. . |
| 0405723A3 | 1/1993 | European Pat. Off. . |
| 0631243A2 | 12/1994 | European Pat. Off. . |
| 0631243A3 | 12/1994 | European Pat. Off. . |
| WO 94/12928 | 6/1994 | WIPO . |

OTHER PUBLICATIONS

Fitzgerald et al., "Basic Electrical Engineering", McGraw–Hill Book Co., New York, NY, pp. 646 + 648, 1981.

*Primary Examiner*—Chuong Dinh Ngo
*Assistant Examiner*—Nguyễn Nguyên
*Attorney, Agent, or Firm*—Pennie & Edmonds LLP; Dirk Brinkman

[57] ABSTRACT

An apparatus sums a plurality of columns of binary bits to produce a plurality of partial sum and carry bits. The bits of a particular column being of the same order of magnitude, and the bits of different columns differing in orders of magnitude. The apparatus includes one or more full adder. Each full adder receives three bits as an input to produce a first sum bit and a first carry bit as output. The apparatus also includes one or more half adders. Each half adder receives two bits as input to produce a second sum bit and a second carry bit as output. The full adders and half adder are interconnected as a plurality of interconnecting column adders. Each column adder sums bits of the input of at least one column and generates a partial sum and carry bit. Each column adder has a plurality of stages. A plurality of conductors interconnect the stages of each column adder with other stages in the same column adder and with stages in other adjacent column adders.

11 Claims, 5 Drawing Sheets

WALLACE-TREE MULTIPLIERS USING HALF AND FULL ADDERS

FIELD OF THE INVENTION

This invention relates generally to a method and apparatus for digital multiplication, and more generally to reducing the number of partial product stages associated with multiplication circuits.

BACKGROUND OF THE INVENTION

High speed digital multiplication circuits typically multiply an "n" bit multiplier with an "m" bit multiplicand by generating n partial product products. The partial products are reduced to a final product by adding the partial products at different stages of the circuits.

Because summation at each stage is done in parallel, the time required for the multiplication is the sum of the number of stages times the delay at each stage. Multiplication can be accelerated if the number of stages can be reduced without increasing the delay at each stage.

Traditionally, Wallace-tree full carry save adders (CSA) are used to produce the partial sum. As shown in FIG. 1, each full CSA 100 takes three bits of input (A, B, C) 101–103, and produce an S (sum) bit 104, and a C (carry) bit 105 bit as output. The S bit 104 is produced by an XOR gate 110, and the C bit 105 is produced by three AND gates 120 and an OR gate 130. The carry bit can be propagated to a next column.

SUMMARY OF THE INVENTION

The invention provides an apparatus for summing a plurality of columns of binary bits to produce a plurality of partial sum and carry bits. The bits of a particular column are of the same order of magnitude, and the bits of different columns differ in order of magnitude. The apparatus includes one or more half and full adders.

Each full adder receives three bits as an input to produce a first sum bit and a first carry bit as output. Each half adder receives two bits as input to produce a second sum bit and a second carry bit as output.

The full and half adders are configured as a plurality of interconnecting column adders. Each column adder sums bits of the input of at least one column, and generates a partial sum and carry bit. Each column includes a plurality of stages.

Conductors interconnect the full and half adders as stages of each column adder with other stages in the same column adder, and with stages in other column adders.

Each half adder includes an XOR gate receiving the two bits of input to produce the second sum bit, and an AND gate receiving the two bits of input to produce the second carry bit. As an advantage of the invention, half adders in a Wallace Tree multiplier can generate as many outgoing carry bits to a next column as there incoming carry bits from a previous column to reduce the number of stages in the multiplier.

DETAILED DESCRIPTION OF PREFERRED EMBODIMENTS

Figure 1:
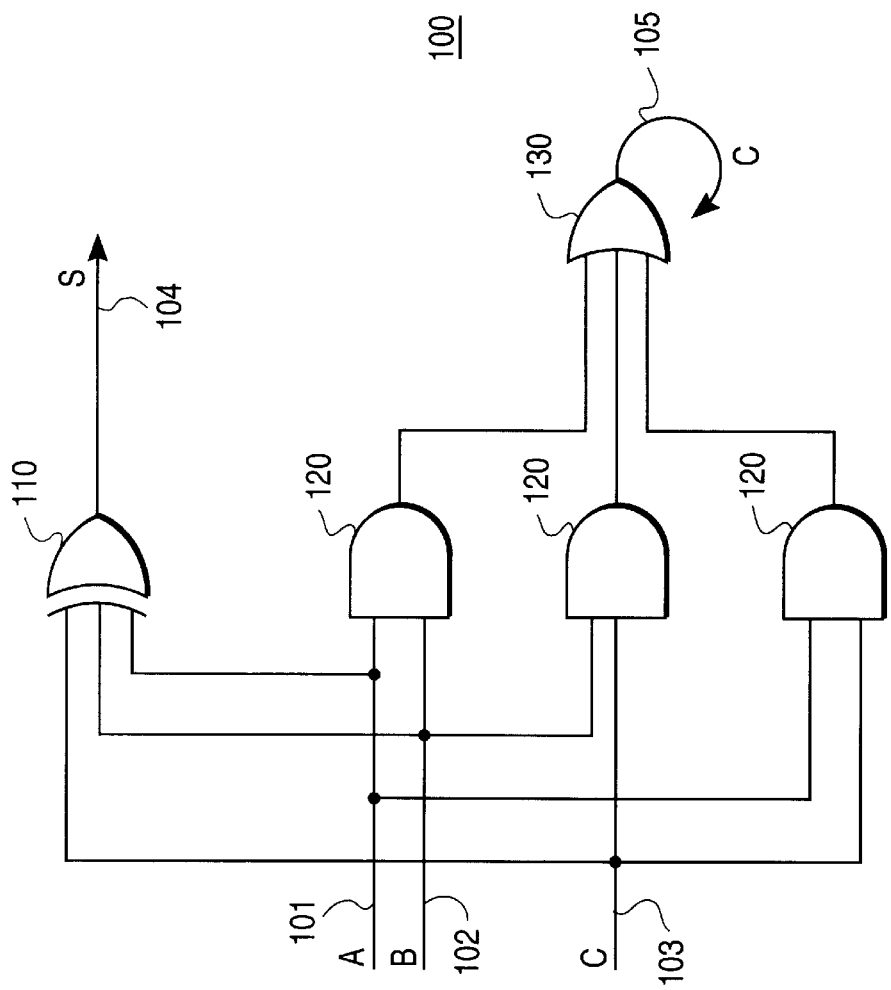
FIG. 1 is a circuit diagram of a prior art full carry save adder.
Figure 2:
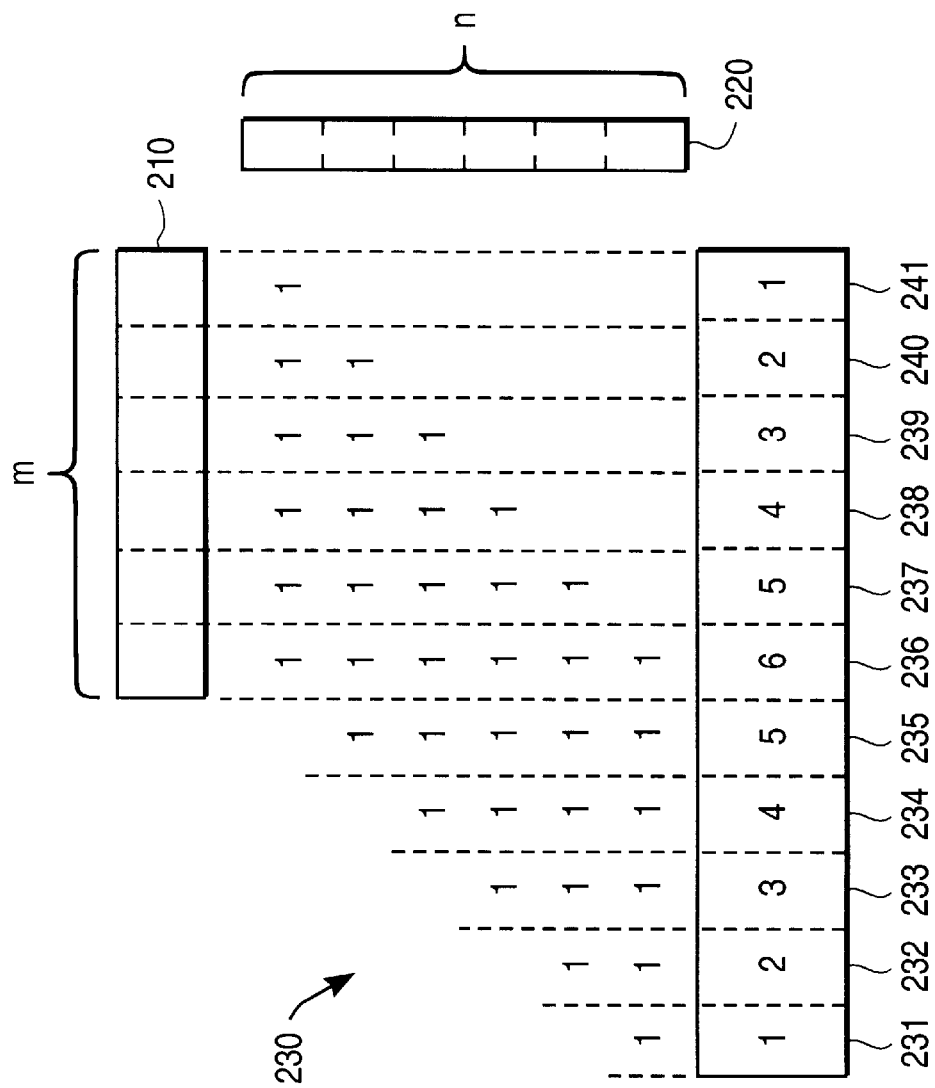
FIG. 2 is a bit array depicting a multiplication.

As shown in FIG. 2, where "m" and "n" are both six, the parallel multiplication of an "n" bit multiplier 210 by an "m" bit multiplicand 220 results in "m+n−1" columns 231–241 of partial product bits. Each row is offset from the previous row by one bit. The number of bits to be reduced in each of the columns 231–241, from left to right, are respectively 1, 2, 3, 4, 5, 6, 5, 4, 3, 2, and 1. A Wallace-tree multiplier built from full adders can reduce three inputs to 2 outputs resulting in a reduction of the partial products by factors of approximately 1.5 at each stage of the adder tree circuitry.

Table A gives the maximum number of input bits that can be reduced to sum and carry bits by a traditional Wallace-tree multiplier constructed with full adders at each stage. This table assumes that the number of bits in adjacent columns is the same, and therefore, the incoming carry bits into a particular column from a previous column are the same in number and position as outgoing carry bits from the particular column to a next column.

TABLE A

| Stages | 1 | 2 | 3 | 4 | 5 | 6 | 7 |
|--------|---|---|---|---|----|----|----|
| Bits   | 3 | 4 | 6 | 9 | 13 | 19 | 28 |

For example, if there are five input bits to reduce in all columns, then the traditional multiplier tree configured with full adders requires three stages. The first stage reduce five bits to four, and the second stage reduces four bits to three. The third stage produces the sum and carry bits for input to a carry propagate adder.

As each stage reduces the number of bits, carry bits are generated and propagated to the next more significant column, i.e., the next left adjacent column. Full adder Wallace-tree multipliers are useful for multiplications where the number and position of the carry bits coming into a column correspond exactly with the carry bits going out from the column. However, this only happens in the center columns of an "n" by "m" bit multiplier where "n" is not equal to "m."

In the general, and in the most common situation, where "n" is equal to "m," the number of bits to be added is not the same in all columns. In this case, the position (stage) and number of carry bits coming in are not the same as those going out.

Figure 3:
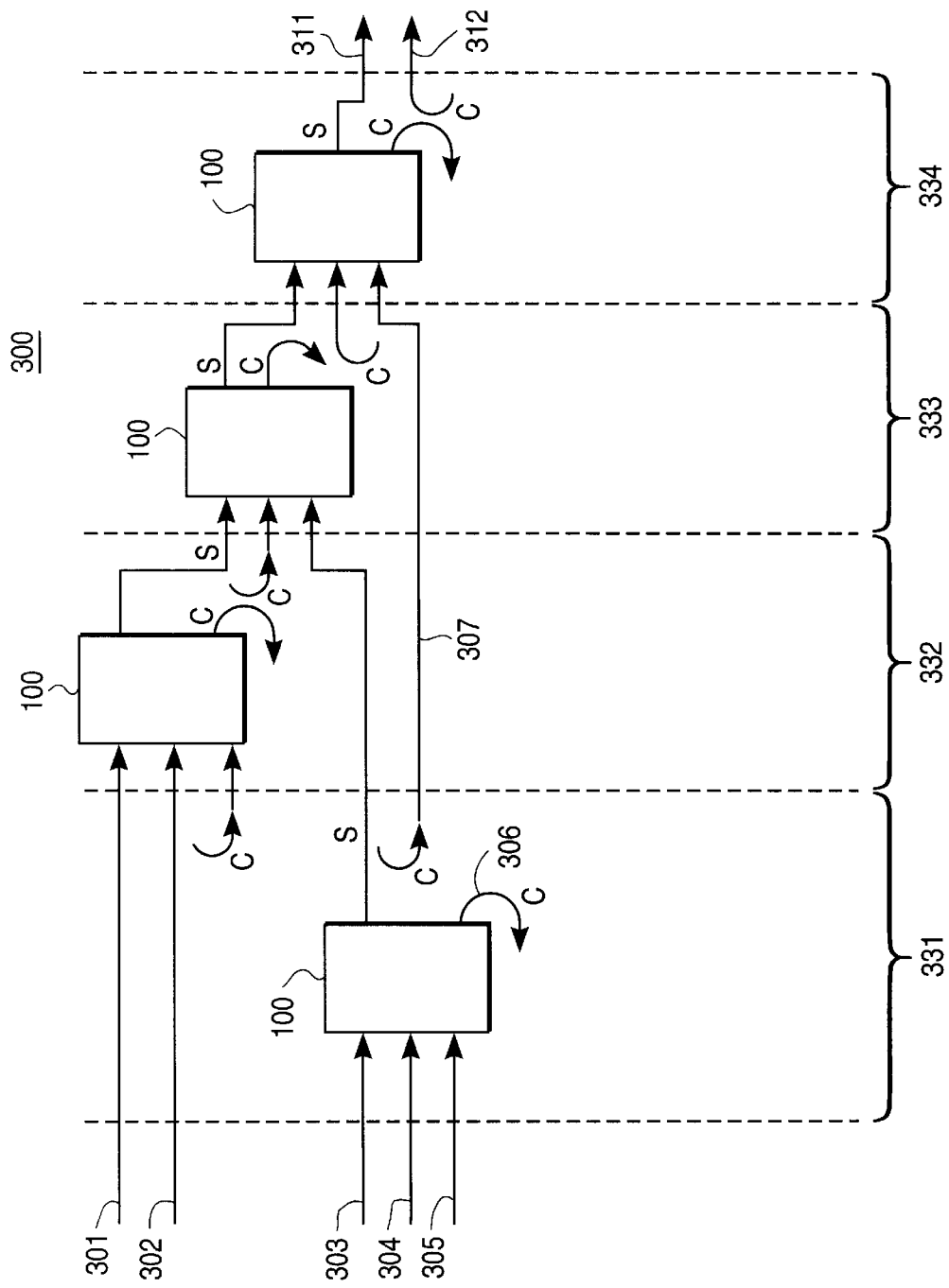
FIG. 3 is a circuit diagram of full adders connected as a prior art multiplier tree.

In some cases as shown in FIG. 3, columns may have two additional bits, e.g., bits not going into a full adder at the current stage. For example, if five bits 301–305 need to be reduced, only three bits 303–305 can go into the first stage 331 because five divided by three produces a remainder of two. Typically, the additional bits (bits 301 and 302) are directly promoted to the next stage (332) of the prior art tree. In FIG. 3 (and FIG. 5), the up and down orientations of the carry bits 307–306 respectively indicate an incoming bit from a previous column, and an outgoing bit to the next column.

If a next less significant column, e.g., the next right adjacent column, has more bits, then the number of carry bits coming into a column will exceed the number of bits leaving the column to a more significant column. This will result, even with a bit reduction of the full adders, in more bits than can be reduced by the expected number of remaining stages given the initial bit count.

Therefore, the net number of bits going into the second stage is still five bits. Two full adders cannot be used in the first stage, because the incoming carry bits from the previous column are delayed by one stage, and hence can only be processed by a next stage of the Wallace-tree multiplier. So instead of reducing five bits to four, as expected, there is no reduction at all at the first stage 331 as also shown in FIG. 3. If nothing but full adders are used, then bit reductions do not take place until later stages 332–334 to produce the sum and carry bits 311–312.

Figure 4:
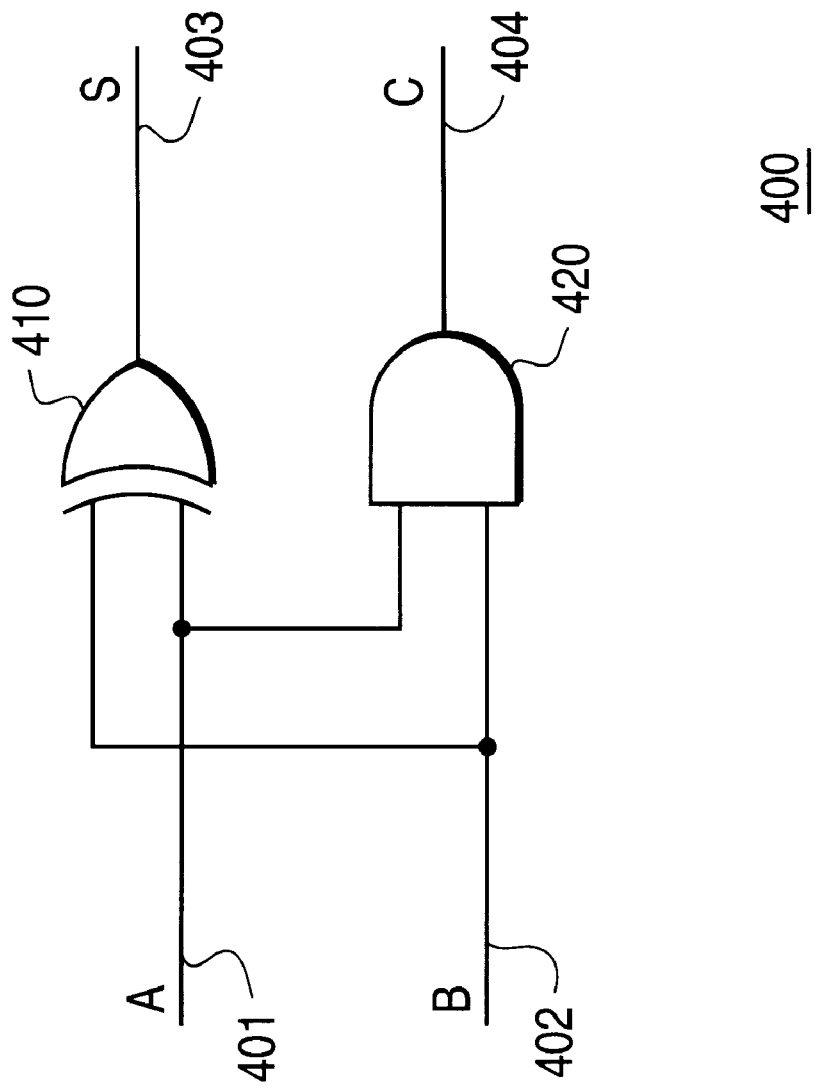
FIG. 4 is a circuit diagram of a half adder.

In a preferred embodiment of the invention, the number of stages of a Wallace-tree multiplier can be reduced by employing half adders. FIG. 4 shows a half adder 400 receiving two inputs (A and B) 401–402 to produce as output a sum (S) bit 403, and a carry bit 404. The sum bit 403 is derived by an XOR gate 410, and the carry bit 404 is the output of an AND gate 420. In a half adder, the sum and carry are never asserted (true or logical one) at the same time.

Half adders are usually not considered to be useful for Wallace-tree multipliers, because half adders take in two bits to produce a sum and a carry bit. With half adders, there is no reduction in the number of bits, there is only a "sideways" movement of bits from column to column.

Figure 5:
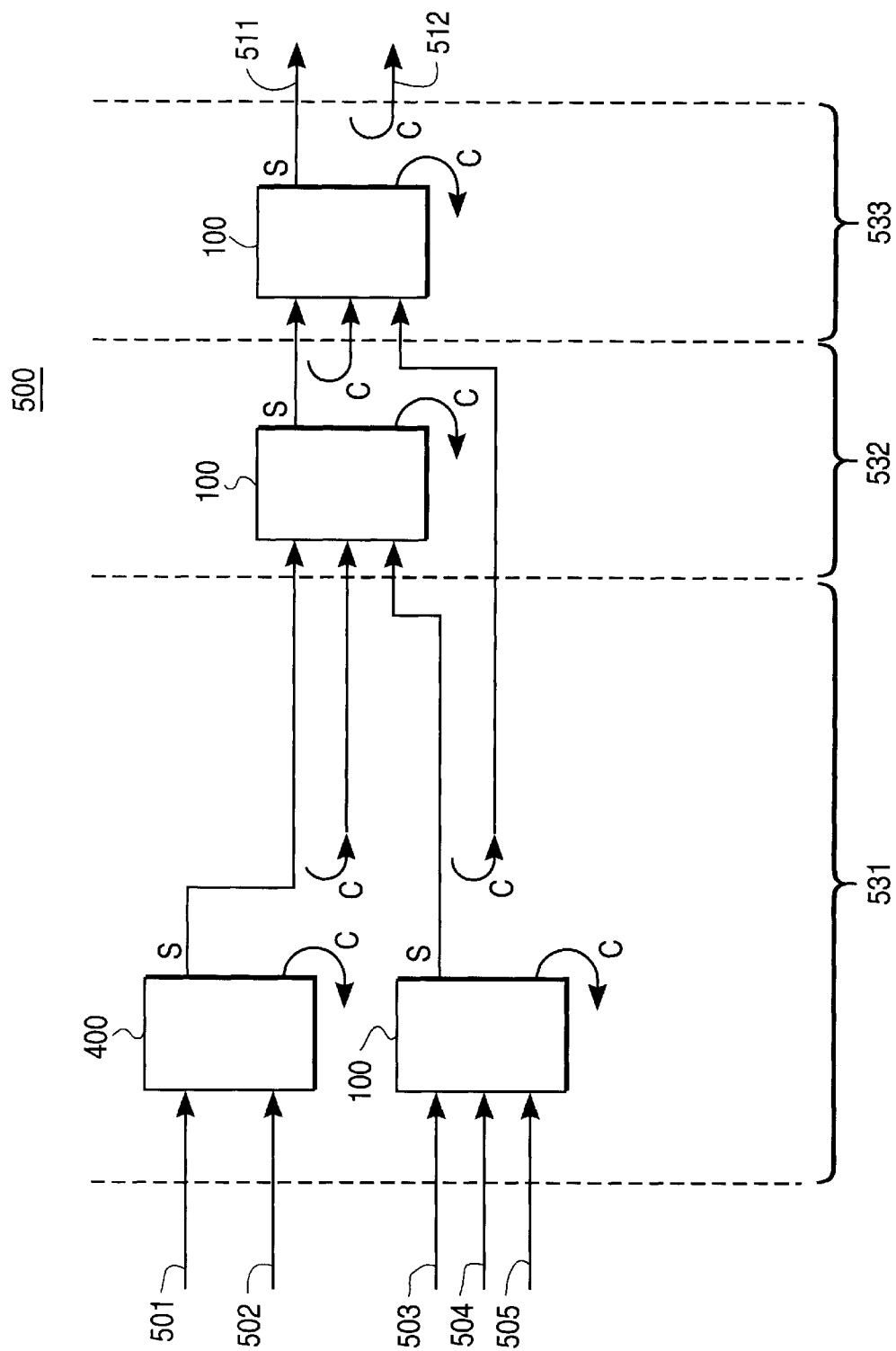
FIG. 5 is a circuit diagram of full and half adders connected as a tree multiplier according to the invention.

However, if the partial product reduction tree of FIG. 3 is configured with a half adder, as shown in FIG. 5, the number of stages can be reduced by one. Clearly, this will yield a faster Wallace-tree multiplier using fewer circuit gates.

The tree 500 has two bits 501–502 going into the half adder 400 of the first stage 531. The other three bits 503–505 go into a full adder 100. The first stage 531 reduces the five bits to four, and the second stage 532 reduces the number of bits to three. The last stage produces the sum and carry bits 511–512. Thus, one less stage of logic gates is used to reduce the number of the circuits as well as stage-to-stage gate delays.

In general, half adders in a Wallace-tree multiplier allow fewer stages if the column being reduced has two remainder bits (after dividing the number of bits in the column by three), and the column to the right (less significant) has more bits than the column being reduced.

Half adders can also be used where any one column has more bits than any other column. Consider the case of a twenty-by-twenty bit multiplier. In this case, the central five columns will have, 18, 19, 20, 19, and 18 bits to reduce. This would require at least a seven stage Wallace-tree with the twenty bits of the central column fed to six full adders, and two left over bits to go to a full adder of the next stage. However, if the two remainder bits are sent directly to a half adder, then the next stage will have 12, 14, 13, 13, and 11 bits to reduce in the central columns.

From Table A, fourteen bits require six stages of in a full adder tree. But instead of sending twelve of the fourteen bits to four full adders, and passing the remaining two bits to the next stage, the remaining bits can be sent to a half adder, as disclosed herein, to yield a central distribution of 9, 9, 9, 8, and 8 bits.

Because the maximum number of bits in the central column is now nine, the nine bits can be reduced to two bits in three stages, for a total of six stages, one less than a multiplier tree constructed only from full adders.

Half adder Wallace-tree multipliers can also be used in compound computations which may produce uneven bit distribution in the columns. For example, a multiplication to generate a cumulative total generally performs the calculation (A×B)+C, where C is the running total being sunned.

Other applications for half adders include Baugh-Wooley sign multipliers, and compound blended multipliers as are used in graphic generators. In the latter case, the computation is generally in the form:

$A(\alpha)+B(1-\alpha)$, where $\alpha$ is some "blending" factor. This computation can be implemented using half adders to reduce the number of stages required.

What is claimed is:

1. An apparatus for summing a plurality of columns of binary bits to produce a plurality of partial sum and carry bits, the bits of a particular column being of the same orders of magnitude and the bits of different columns differing in order of magnitude, comprising:

a full adder, the full adder receiving three bits of the particular column as first input to produce a first sum bit and a first carry bit as output;

a half adder receiving two bits of the particular column as second input to produce a second sum bit and a second carry bit as output, the half and full adders being configured as a plurality of interconnecting column adders, each column adder summing bits of the input of at least one column and generating a partial sum and carry bit, each column adder having a plurality of stages; and a plurality of conductors for interconnecting the stages of each column adder with other stages in the same column adder and with stages in other column adders, wherein the half adder is used in the particular column when the particular column has two remainder bits after dividing the number of bits in the particular column by three, and an adjacent column having bits with a lower order of magnitude has more bits than the particular column.

2. The apparatus of claim 1 wherein the half adder further comprises:

an XOR gate receiving the two bits of the second input to produce the second sum bit; and an AND gate receiving the two bits of the second input to produce the second carry bit.

3. The apparatus of claim 1 wherein a particular stage includes the half adder to generate as many outgoing carry bits to a next adjacent column as there are incoming carry bits from a previous adjacent column.

4. A method for summing a plurality of columns of binary bits to produce a plurality of partial sum and carry bits using a Wallace Tree multiplier, comprising the steps of:

a) providing bits of a particular column with a same order of magnitude and bits of different columns with differing orders of magnitude;

b) inputting a first set of three bits to a full adder of the particular column to produce a first sum bit and a first carry bit as an output;

c) inputting a second set of two bits to a half adder of the particular column to produce a second sum bit and a second carry bit as another output, wherein the half adder is used in the particular column when the particular column has two remainder bits after dividing the number of bits in the particular column by three, and an adjacent column having bits with a lower order of magnitude has more bits than the particular column;

d) arranging a plurality of the full adder and the half adder as a plurality of interconnecting column adders; and e) adding summing bits of the input of at least one particular column and generating a partial sum and carry bit.

5. The method of claim 4, wherein inputting step (c) comprises inputting the second set to an XOR gate to produce the second sum bit and an AND gate to produce the second carry bit.

6. The method of claim 4, wherein each column adder is grouped in stages to produce the partial sum and carry bit.

7. The method of claim 6, wherein the arranging step employs a plurality of conductors for interconnecting the stages of each column adder with other stages in the same column adder and with stages in other column adders.

8. A method of reducing a number of stages in a Wallace Tree multiplier having a plurality of columns, comprising the steps of:

a) providing a number of bits to a column;
   b) employing at least one full adder for every three bits from step (a) as a first input to produce a first output sum and carry bit;
   c) employing a half adder to receive every two bit remainder after step (b) as a second input to produce a second output sum and carry bit when an adjacent column having bits with a lower order of magnitude has more bits than the particular column, the half and full adders being configured as a plurality of interconnecting column adders, each column having a plurality of stages; and
   d) adding summing bits of the first and second inputs for each column and generating a partial sum and carry bit;
   whereby employing the half adder to receive the two bit remainder in a first stage reduces the number of stages in the column adder as compared to using a full adder in the second stage to receive the two bit remainder.

9. The method of claim 8, wherein employing the half adder comprises inputting the two bit remainder to an XOR gate to produce the second output sum bit and an AND gate to produce the second output carry bit.

10. A multiplier circuit for obtaining a product of an M-bit multiplier and an N-bit multiplicand, comprising:

a set of interconnecting column adders, receiving the multiplier and the multiplicand, generating a summand matrix, and outputting the product, the summand matrix having M×N summand matrix bits having M rows and N columns, each column adder for adding the summand matrix bits in one of the columns, each column representing a different bit position in the product, the summand matrix bits of different columns differing in order of magnitude, the column adders being arranged in increasing order magnitude of the summand matrix bits, wherein
   a particular column adder of the at least one column adder includes:
      at least one full adder receiving three bits of the summand matrix as first input to produce a first sum bit and a carry bit, and
      at least one half adder receiving two summand matrix bits as second input to produce a second sum bit and a second carry bit as output, when the summand matrix bits of the particular column adder has two remainder bits after dividing the number of summand matrix bits in the particular column by three, and an adjacent column adder of summand matrix bits with a lower order of magnitude has a number of summand matrix bits exceeding the number of summand matrix bits of the particular column.

11. The apparatus of claim 10 wherein the half adder further comprises:

an XOR gate receiving the two bits of the second input to produce the second sum bit; and
   an AND gate receiving the two bits of the second input to produce the second carry bit.

* * * * *